United States Patent [19]

Lapham

[11] Patent Number: 4,479,522

[45] Date of Patent: Oct. 30, 1984

[54] PORTABLE SAFETY DEVICE FOR INFLATION OF TRUCK TIRES

[75] Inventor: Darrell L. Lapham, Akron, Ohio

[73] Assignee: GenCorp Inc., Akron, Ohio

[21] Appl. No.: 405,830

[22] Filed: Aug. 6, 1982

[51] Int. Cl.³ .............................................. B60C 25/00
[52] U.S. Cl. ....................................................... 157/1
[58] Field of Search ..................................... 157/1, 1.1

[56] References Cited

U.S. PATENT DOCUMENTS 2,835,318  5/1958  Conger ..................................... 157/1
4,057,093  11/1977  Joines ...................................... 157/1

Primary Examiner—James G. Smith

[57] ABSTRACT

A safety cage device is disclosed for use in restraining a multiple part rim during the inflation of a truck tire. The safety device comprises a base having a pair of outwardly extending arms and a shaft which extends through the center of the rim, and a retainer which fits on the shaft and has outwardly extending arms to hold the top of the rim. If the rim explodes, a portion of the retainer inelastically deforms to absorb the force of the explosion. The energy-absorbing deformation of a portion of the device allows other portions of the device to do a better job of retaining the various parts of the rim.

5 Claims, 5 Drawing Figures

PORTABLE SAFETY DEVICE FOR INFLATION OF TRUCK TIRES

BACKGROUND OF THE INVENTION

1. Field of the Invention

This invention relates to a safety device for restraining a multiple part rim during the inflation of a truck tire, and particularly to such a device which is lightweight and portable, and suitable for field use.

2. Description of the Prior Art

Truck tires are commonly mounted on rims having two or more parts. During the mounting and inflation of truck tires on multiple part rims, it is possible that the lock ring and/or other parts of the rim, may become separated from the tire-rim assembly, causing the bead of the tire to become unseated from the rim and thus a sudden release of pressurized air from within the tire. This released air pressure can be extremely high and can cause the separated rim parts to be projected away from the assembly at considerable speeds. When this happens, the rim is said to "explode". In order to protect persons and property in the event of such a rim explosion, safety devices or cages are used to restrain the multiple part rim during the inflation of truck tires. These cages must be capable of withstanding the large forces produced by the impact of flying rim parts. As a result, most of the cages are heavy and not readily moved.

In many instances, however, it is desired to mount and inflate a truck tire in the field. For example, when a tire is repaired and must be inflated, such reinflations may occur on the highway or elsewhere away from the location of a tire cage. It is often difficult or impossible to move the heavy tire cages to a field location. As a result, it is usually necessary to take the rim and tire to an installation where the cage is available to inflate the tire.

Several portable light-weight safety cages have been manufactured by others for use in the field. One such cage, manufactured in Akron, Ohio by the Ken-Tool Division of Warren Tool Corporation, consists of two tubular-metal sections, each bent in a U-shape and joined to each other by a hinge member in the middle of the curved portions of their U-shapes. Flat metal strips are welded to the ends of the legs of each U-shaped member to form two continuous bands that encircle the tire. At the junctures of the strips with the legs, the bands are connected by collapsible braces, similar to those used in holding the collapsible legs of card tables extended. These braces are collapsed during storage of the cage, but during use they are extended to keep the leg-end portions of the U-shaped members spread from one another, while their curved portions are joined by the mentioned hinge member. During inflation of a tire on a multi-part rim, the hinged, curved portions of the U-shaped members wrap laterally across one portion of the tread, while the braced-apart flat strips of these members extend across a diametrically opposed portion of the tread, with the legs of the U-shaped members extending in chordal relation across the tire sidewalls and rim.

One problem with the foregoing safety cage is that the legs of the U-shaped members are easily bent outwardly by the force of a rim explosion, allowing the lock ring of the multi-part rim to escape from between them. Another problem is that collapsible brace members can be easily broken by the force of the explosion, allowing the rest of the tire and rim assembly to become dislodged from the cage.

Another type of portable cage, sold by Myers Tire Supply Company of Akron, Ohio, has a base made of two elongated tubular steel members, connected to each other in side-by-side relationship, and designed to support the tire and rim assembly on its side, with its central axis extending upwardly. The base also includes a shaft extending upwardly from a plate that is mounted on top of the two tubular steel members. When the tire and rim assembly is placed on the base, the shaft extends through the central opening in the rim. The cage also includes a retainer made of two elongated tubular steel members, connected to each other in side-by-side relationship by a centrally located plate that has an opening through which the shaft of the base extends. The tubular steel members of the retainer extend over the top of the tire and rim assembly, and the retainer is locked in place by a U-shaped clip that slides over the central plate and into a groove on the shaft of the base.

One problem with this cage is that because of the large central openings in multipiece rims, the tire and rim assembly can, during a rim explosion, shift laterally and then rotate upwardly around the outward edges of the tubular steel members of the retainer, thus becoming free of the cage. Making the tubular members of the retainer long enough to prevent this would unduly increase the weight and storeability of the cage, particularly for cages capable of holding the larger sizes of tire and rim assemblies.

Another problem with this cage is the tendency of the tubular members of the retainer to bend upwardly. This bending, combined with elongated flexing of the lock ring, can allow the lock ring to escape from the cage.

Still another problem with the latter cage resides in the ability of the tubular steel members of the retainer to become aligned with the tubular steel members of the base. With such an alignment, the more the base resists the forces of the explosion, the more this resistance is transmitted to the retainer, and vice-versa. Thus, there is a greater tendency for both the base and the retainer to deform and allow the lock ring to escape when these parts are aligned.

SUMMARY OF THE INVENTION

The present invention provides a portable light-weight safety cage, suitable for field use in restraining a multi-part rim and tire assembly during tire inflation. Like the latter of the two cages mentioned above, the cage of the present invention has a base having extending portions, preferably elongated tubular members, with a shaft extending perpendicular to these members, and a retainer, also having extending portions preferably made of elongated tubular members, with a central opening through which the shaft extends.

However, the cage of the present invention is an improvement over the previously known cages, because it has a number of novel features which solve the problems mentioned above. Its base has an inner support portion that is designed to fit within the central opening of the rim to be restrained, so that lateral movement of the rim is limited, greatly reducing the possibility of the rim rotating up and over one of the outwardly extending portions of the retainer. The retainer also has a portion that is bendable inelastically under the force of a rim explosion, so that this portion absorbs such a force and protects other parts of the retainer from bending. In addition, the retainer is restrained from pivotal movement on the shaft and is positioned with its extending portions at an angle of about 90° with respect to the extending portions of the base. This prevents the base and the retainer from acting against each other in the event of a rim explosion, and increases their ability to retain their respective shapes and prevent the lock ring and/or other parts of the rim from escaping.

DETAILED DESCRIPTION OF THE PREFERRED EMBODIMENT

Figure 1:
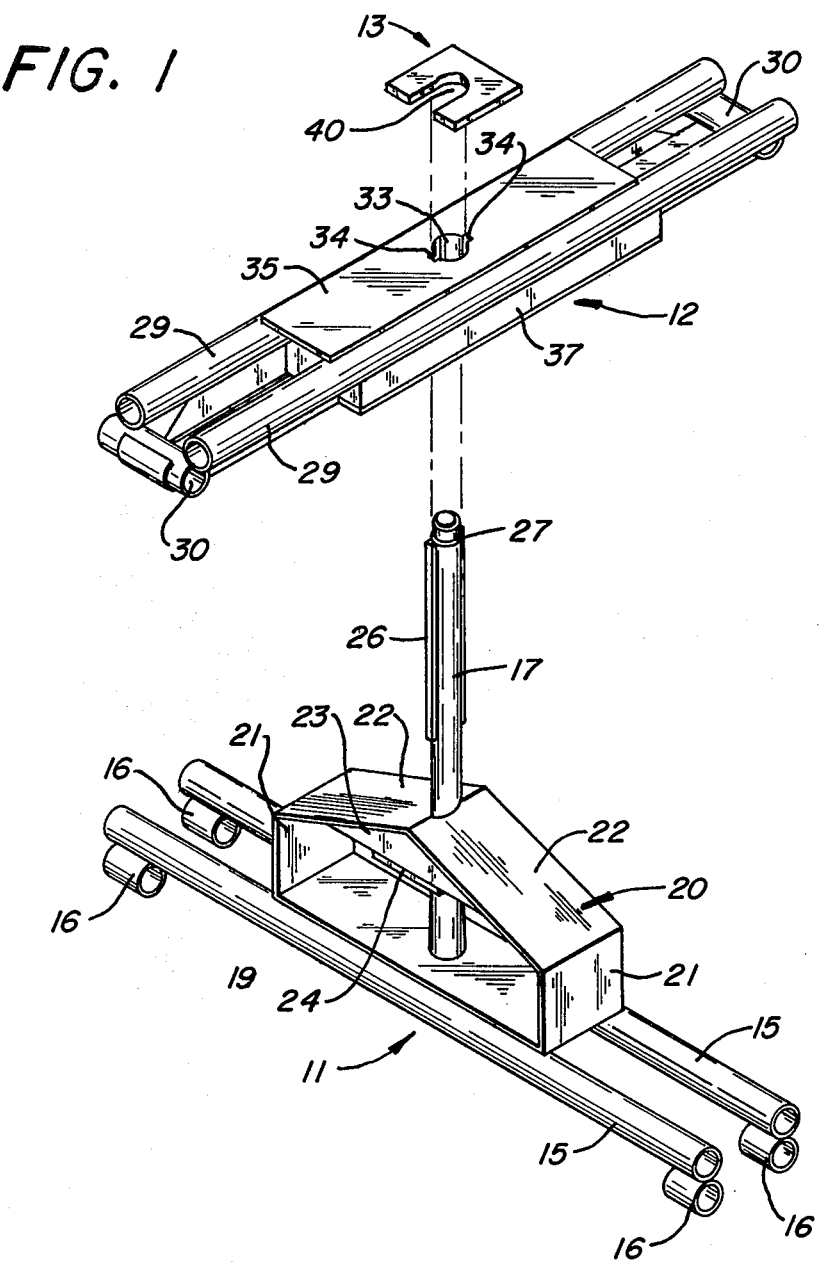
FIG. 1 is a perspective view of the safety device or cage of the present invention showing the elements disassembled in a spaced-apart relationship.

Referring more particularly to the drawings and initially to FIG. 1, there is shown the safety cage device of the present invention with a tire rim R mounted on the device. The tire rim R is of the multiple-part kind, and has a separable lock ring L. The device comprises three elements—a bottom base 11, a top retainer 12, and a retainer clip 13.

The base 11 is designed to fit beneath and support the bottom of the tire rim and to extend through the center of the rim so that the retainer 12 may be mounted on it. The base 11 comprises two tubular arms 15 which are formed of heavy metal pipe. At each end of each arm 15 a small foot 16 is welded to the bottom of the arm. Each of the feet 16 is also formed of heavy metal pipe stock and the same stock may be used to form both the arms 15 and the feet 16.

Figure 2:
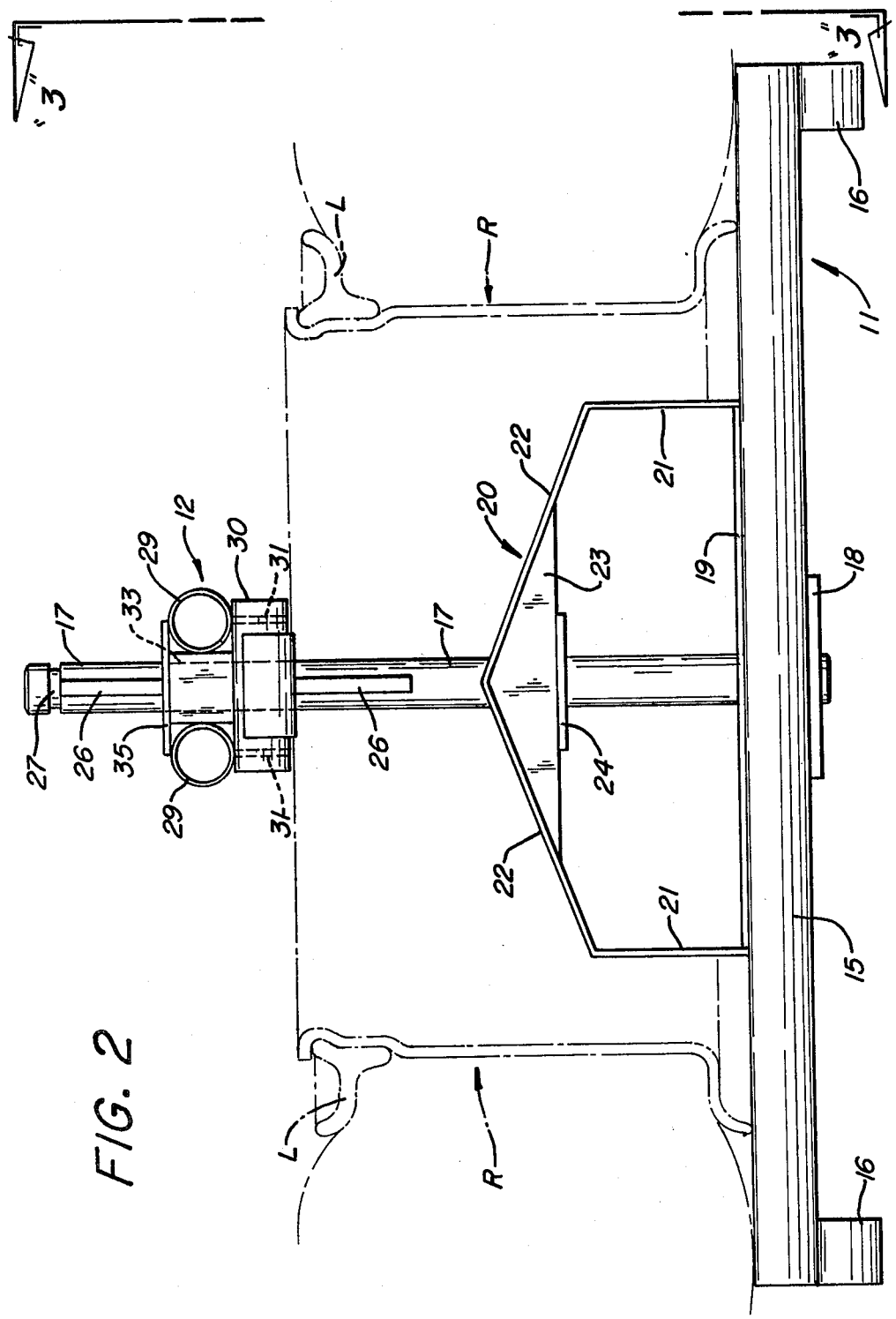
FIG. 2 is a side elevational view of the safety device of FIG. 1.

A tubular shaft 17 extends upwardly in a direction generally perpendicular to the arms 15, forming a T-shape as shown in FIG. 2. The bottom of the shaft 17 is welded to a base plate 18 which is in turn welded to the bottom of the two arms 15 at approximately the middle of each arm. The shaft 17 is further secured to the arms 15 by a center plate 19 which is welded to the top in the middle of each arm. The center plate 17 has a central opening in which the shaft 17 is welded.

A center support 20 extends over the plate 19 and provides additional support for the shaft 17, as well as positioning the shaft within the tire rim. The center support 20 comprises two upstanding portions 21. The bottom of each of the portions 21 is welded to one of the ends of the center plate 19. Connecting portions 22 extend across the tops of the upstanding portions 21. There is a central opening in the connecting portions 22 through which the shaft 17 extends and in which the shaft is welded. A pair of triangularly-shaped support braces 23 are positioned within the connecting portions 22 on each side of the center support 20. The bottoms of the two support braces 23 are connected together by a cross plate 24 which is welded at each end to the bottom of one of the support plates. The cross plate 24 also has a central opening within which the shaft 17 is welded. The shaft 17 is thus supported by being welded to the base plate 18, the center plate 19, the cross plate 24, and the connecting portions 22 of the center support 20.

The upper portion of the shaft 17 has a longitudinally extending key 26 along its length above the center support 20. The key 26 is used to properly position the retainer 12. A circumferential groove 27 is also provided at the top of the shaft 17.

Figure 3:
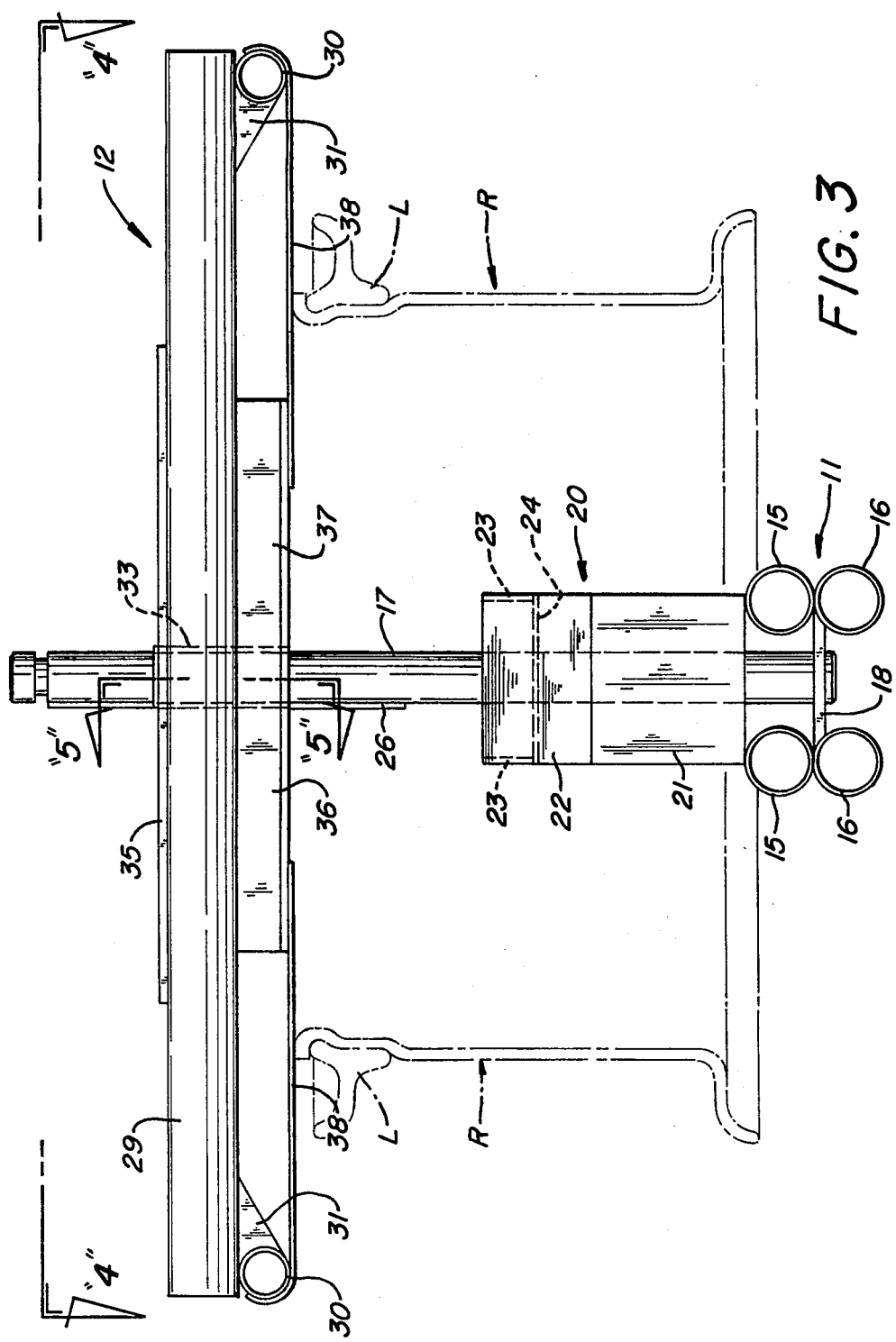
FIG. 3 is a front elevational view taken along line 3—3 of FIG. 2.

The retainer 12 has two outwardly extending tubular arms 29 which are generally of the same length as the base arms 15. The arms 29 are formed of the heavy metal pipe stock, and the same stock may be used to form the arms 15 of the base. The two arms 29 are connected at each end by a tubular end member 30 which is welded to the bottom of each of the arms 29. A generally triangularly-shaped brace 31 (FIG. 3) is welded between the inside of each end member 30 and the bottom of each arm 29.

Figure 4:
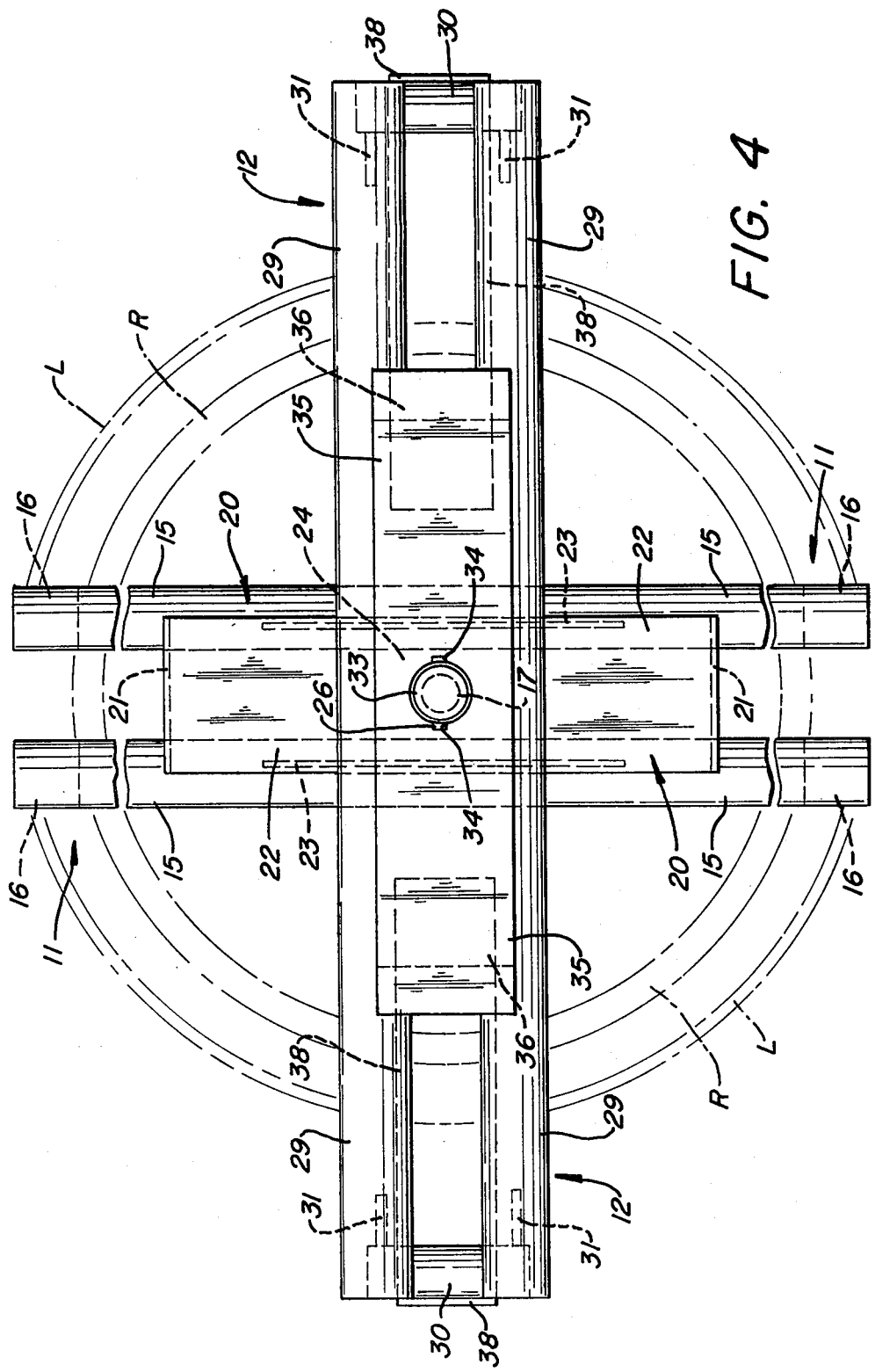
FIG. 4 is a top plan view taken along line 4—4 of FIG. 3.
Figure 5:
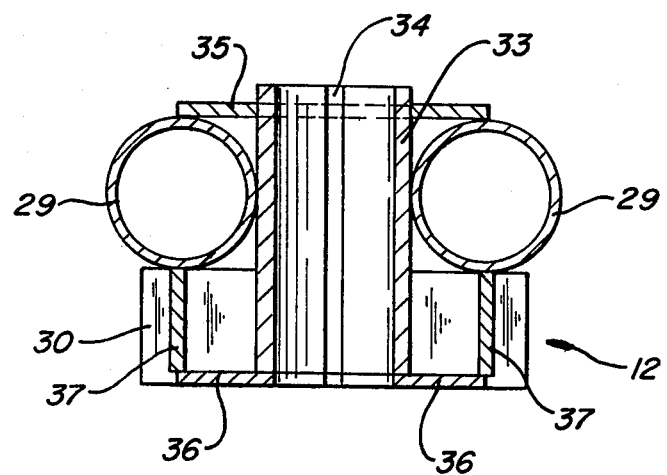
FIG. 5 is a sectional view taken along line 5—5 of FIG. 3.

The retainer 12 is mounted on the shaft 17 by means of a sleeve 33 (FIG. 5) which is provided between the two arms 29 in the center of the retainer. Sleeve 33 is tubular and is provided with a pair of opposed keyways 34 (FIG. 4) either of which is capable of engaging the key 26 on the shaft 17. Because of the engagement of the keyway 34 on the sleeve 33 with the key 26 on the shaft 17, the retainer 12 is always positioned with respect to the base 11 so that the arms 29 are at a 90° angle with respect to the arms 15.

The sleeve 33 is secured to the arms 29 by means of a top plate 35. The top plate 35 has a central opening within which the top of the sleeve 33 is welded. Each side of the top plate 35 is welded to the top of one of the arms 29. The bottom of the sleeve 33 is welded to a lower plate 36 which has a central opening coaxial with the sleeve 33 and the bottom of the shaft 17 is welded to the plate at the opening. The lower plate 36 is attached to the bottom of both arms 29 by a pair of side supports 37.

The bottom of each side support 37 is welded to one of the sides of the lower plate 36, and the top of each side support is welded to the bottom of one of the arms 29. A pair of outer plates 38 are provided, each extending from one of the ends of the lower plate 36 to one of the end members 30. One end of each outer plate 38 is welded to the bottom of the lower plate 36, and the other end is curled around the end member 30 and welded to the end member. The outer plates 38 bear against the tire rim in use, and these plates are designed to absorb the initial impact of the rim part upon explosion. For this reason, the outer plates 38 are made of thinner material which is more readily deformable, and a clearance is provided above the outer plates 38 between the outer plates 38 and the arms 29 within which the plates may deform upon explosion of the rim R.

The retainer clip 13 (FIG. 1) is generally C-shaped having a central recess 40 which is large enough so that shaft 17 may be inserted fully into the recess 40. The retainer clip 13 is used to position and retain the retainer 12 on the shaft 17 of the base 11, to hold the safety device together.

In use of the safety device of the present invention, the base 11 is placed on the ground with the four feet 16 supporting the base. It is important that the base 11 should always make contact with the ground surface, and that the base should not be placed on any other surface. In an event of an explosion, the base 11 bears on the ground surface and responds as a shock damper. Therefore, the base experiences greater stress since it is placed between the exploding tire rim and the ground.

The tire rim R is then placed over the shaft 17 on the base, so that the rim is positioned around the center support 20. The retainer 12 is then installed on the shaft 17 with the key 26 on the shaft positioned in the keyway 34 of the sleeve 33. The retainer 12 is moved downwardly until the outer plates 38 engage the top of the tire rim R, at which point the retainer clip 13 is inserted with the the shaft 17 in the recess 40. The tire may then be inflated.

In the event of an explosion, the outer plates 38 will absorb the initial impact of the propelled rim parts. The outer plates 38 will bend and inelastically deform upwardly toward the arms 29. If the outer plates 38 break, the propelled lock ring L and/or other parts of the rim R will be captured between the end members 30 and the side supports 37 of the retainer 12. The arms 15 of the base 11 and the arms 29 of the retainer 12 will stress to absorb the force of the explosion. However, the arms 15 and 29 will not be stressed beyond their elastic limits, so that they will retain their shape and the parts of the tire rim will be restrained within the device. By designing the device so that a portion of the device will deform to absorb the force of the explosion, other portions are protected and do not deform as readily, thus allowing these parts to do a better job of retaining the various parts of the tire and rim assembly. In addition, the retainer 12 is always installed at a 90° angle with respect to the base 11, allowing these parts to act independently rather than against each other, and increasing the ability of each to restrain the lock ring and other parts of the tire and rim assembly. Furthermore, the inner center support portion 20 limits lateral movement of the rim and thus prevents the tire and rim assembly from rotating up and over one of the ends of extending arms 29. While gaining all of these advantages, both the retainer 12 and the base 11 are relatively flat when disassembled, the device takes up a minimum amount of room and can be easily stored.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed:

1. An improved safety device for restraining a multiple part rim during inflation of the tire on the rim, including a base for supporting the tire and the rim, the base having outwardly extending portions which extend beneath the rim, the base also having a shaft extending perpendicularly to the extending portions for insertion through the center of the rim; and a retainer having a central opening through which the shaft extends, the retainer also having outwardly extending portions which extend over the top of the rim, the rim capable of being restrained between the extending portion of the base and the retainer for absorbing the force of the rim upon explosion of the rim during inflation, wherein the improvement comprises:

said outwardly extending portions of said retainer including relatively stiff arms, outer end support members and central support members depending from said relatively stiff arms at the respective outer end and central portions of said relatively stiff arms, and relatively bendable plates mounted on and extending between said outer end and central support members and spaced beneath said relatively stiff arms, each of said relatively bendable plates having their portions between said outer end and central support members engagable with said rim and having a yield point below the stress that would normally be exerted upon said plate in the event of an explosion of the rim during tire inflation, the plate thus being bendable inelastically under the force of such an explosion.

2. An improved safety device for restraining a multiple part rim during inflation of the tire on the rim, including a base for supporting the tire and the rim, the base having outwardly extending portions which extend beneath the rim, the base also having a shaft extending perpendicularly to the extending portions for insertion through the center of the rim; and a retainer having a central opening through which the shaft extends, the retainer also having outwardly extending portions which extend over the top of the rim, the rim capable of being restrained between the extending portion of the base and the retainer for absorbing the force of the rim upon explosion of the rim during inflation, wherein the improvement comprises:

means to restrain the retainer from pivotal movement on the shaft and to position the retainer with the extending portions thereof at an angle of about 90° with respect to the extending portions of the base.

3. An improved safety device for restraining a multiple part rim during inflation of a tire on the rim, including a base for supporting the tire and the rim, the base having a shaft extending upwardly for insertion through the center of the rim, the base also having lower arms which extend outwardly generally from the axis of the shaft and which may extend beneath the rim, and a retainer having a central opening through which the shaft extends, the retainer having upper arms which extend outwardly from the axis of the central opening, wherein the improvement comprises:

means to restrain the retainer from pivotal movement about the shaft and to position the retainer with the upper arms extending at about 90° with respect to the lower arms of the base, the upper arms extending over the top of the rim, and the retainer also having outer end support members and central support members depending from the upper arms at the respective outer end and central portions of the upper arms, and plates which are mounted on and extend between said outer end and central support members and are spaced beneath the upper arms, the plates being relatively bendable compared to said arms, the plates having their portions between said outer end and central support members engagable with said rim and capable of absorbing the force of the rim upon explosion of the rim during tire inflation and having yield points below the stress that would normally occur in said plates in the event of such an explosion.

4. The safety device according to claim 3, wherein the improvement also comprises the base having an inner support portion for fitting within the rim and limiting lateral movement of the rim.

5. The safety device according to claim 2 or claim 3 wherein said means to restrain and to position said retainer include at least one key mounted on and extending lengthwise of the shaft, said retainer having a keyway in said central opening through which said key extends.

* * * * *